United States Patent [19]

Vine

[11] Patent Number: 5,664,718

[45] Date of Patent: Sep. 9, 1997

[54] DRINK HOLDER

[76] Inventor: Michael P. Vine, 1450 Lawson, Houston, Tex. 77023

[21] Appl. No.: 322,206

[22] Filed: Oct. 13, 1994

[51] Int. Cl.⁶ ..................................... B60N 3/10
[52] U.S. Cl. .................. 224/545; 224/413; 224/414; 224/553; 224/926; 248/312.1; 248/311.2
[58] Field of Search ..................... 224/545, 926, 224/148, 548, 553, 555, 282, 412, 413, 414, 428; 248/312.1, 311.2

[56] References Cited

U.S. PATENT DOCUMENTS

| D. 218,834 | 9/1970 | Smith et al. | |
|---|---|---|---|
| 2,926,879 | 3/1960 | Dietrich | 224/926 |
| 3,734,439 | 5/1973 | Wintz | |
| 3,842,981 | 10/1974 | Lambert | 224/926 |
| 4,434,961 | 3/1984 | Hoye | 248/311.2 |
| 4,721,276 | 1/1988 | Moss | 248/205.2 |
| 4,819,843 | 4/1989 | Nakayama | 224/926 |
| 4,877,164 | 10/1989 | Baucom | 224/926 |
| 4,972,982 | 11/1990 | Harbour | 224/148 |
| 4,993,675 | 2/1991 | Walker | 248/311.2 |
| 5,088,673 | 2/1992 | Chandler | 224/926 |
| 5,170,981 | 12/1992 | Lin | 248/311.2 |
| 5,337,984 | 8/1994 | Houck | 224/926 |
| 5,340,006 | 8/1994 | Li | 224/148.7 |
| 5,407,158 | 4/1995 | Baird | 224/926 |
| 5,489,055 | 2/1996 | Levy | 224/926 |

FOREIGN PATENT DOCUMENTS

| 4022193 | 1/1992 | Germany | 224/926 |
|---|---|---|---|

Primary Examiner—Renee S. Luebke
Assistant Examiner—Charles R. Eloshway
Attorney, Agent, or Firm—Rosenblatt & Redano, P.C.

[57] ABSTRACT

A beverage container receptacle which supports the container above its center of gravity. When used with beverage containers having tapered sides, compressive force between the receptacle and the beverage container restrains vertical movement of the container. In other embodiments, the weight of the container and its contents or a self-actuating latch keep the container within the confines of the receptacle.

2 Claims, 10 Drawing Sheets

DRINK HOLDER

FIELD OF THE INVENTION

The present invention relates to beverage container receptacles, particular of the type as may be mounted on vehicles such as motorcycles, recreational vehicles (including ATV's and snowmobiles), and boats.

BACKGROUND OF THE INVENTION

Beverage container receptacles are typically designed to support the container from the bottom, with sidewalls provided to restrain horizontal movement of the container. Most modern vehicles, for example, have integrated beverage container holders in the form of depressions or retractable trays in the vehicle body. These receptacles are generally larger than the beverage container, so that the beverage container tends to slide within the confines of the receptacle in response horizontal acceleration. In these embodiments when horizontal sliding is restricted, or when the beverage container slides as far as possible, the horizontal acceleration is translated to the contents of the beverage container. This causes the contents to "slosh" and occasionally spill, even if the beverage container is substantially covered.

Other receptacles are designed to be suspended from the vehicle door, and similarly support the beverage container from the bottom, with side members to restrain horizontal movement. However, such designs may be unsuitable for mounting on vehicles such as motorcycles and boats. Furthermore these receptacles do not prevent the container from springing from their confines in response to vertical or rotational movement caused by bumps or waves. Nor do these receptacles effectively accommodate horizontal acceleration or rotational movement. It is an object of the present invention to provide a receptacle which holds the beverage container despite such vertical or rotational movement. It is a further object of the present invention to provide a beverage container receptacle with greater response to horizontal and rotational movement without spillage.

SUMMARY OF THE INVENTION

A beverage container receptacle which supports the container above its center of gravity is disclosed. When used with beverage containers having tapered sides, compressive force between the receptacle and the beverage container restrains vertical movement of the container. In other embodiments, the weight of the container and its contents or a self-actuating latch keep the container within the confines of the receptacle.

DETAILED DESCRIPTION OF THE INVENTION

Figure 1:
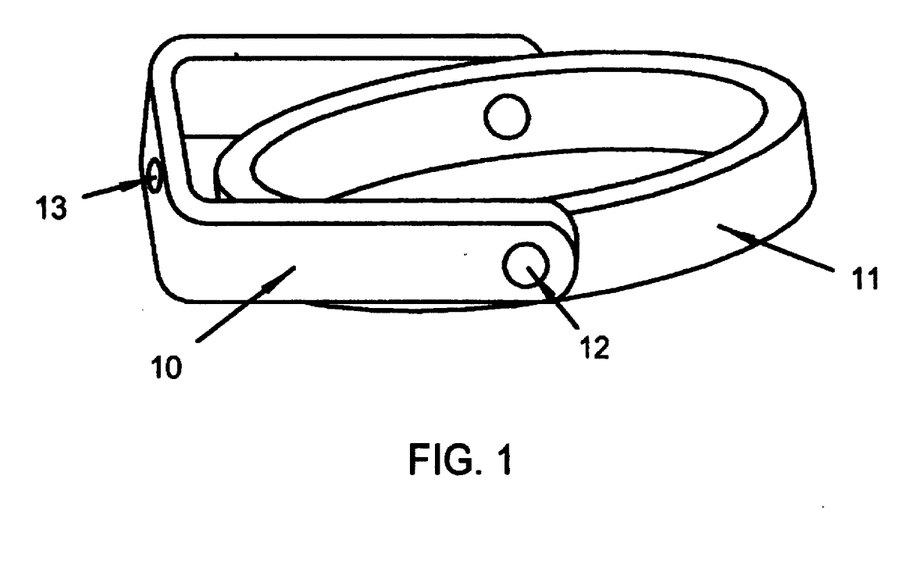
FIG. 1 is the receptacle of the present invention.

In accordance with the preferred embodiment of the present invention, a beverage container is supported by a support member 11 above its center of gravity 22. Preferably a U-shaped bracket 10 is used, which may be mounted in any appropriate location, and support member 11 is furnished with a pair of cylindrical pivots 12 which are received by holes in the bracket 10. If bracket 10 is also pivotally mounted using hole 13, then the beverage container enjoys two degrees of rotational freedom and may, with its contents, swing freely in response to any horizontal acceleration. Since the beverage container is pivotally supported above its center of gravity, greater response to horizontal movement without spillage is possible than with the prior designs. In the present invention, the beverage container and its contents will tend to swing in response to horizontal acceleration rather than sliding within a depression or rigidly translating the acceleration to the contents.

Figure 8:
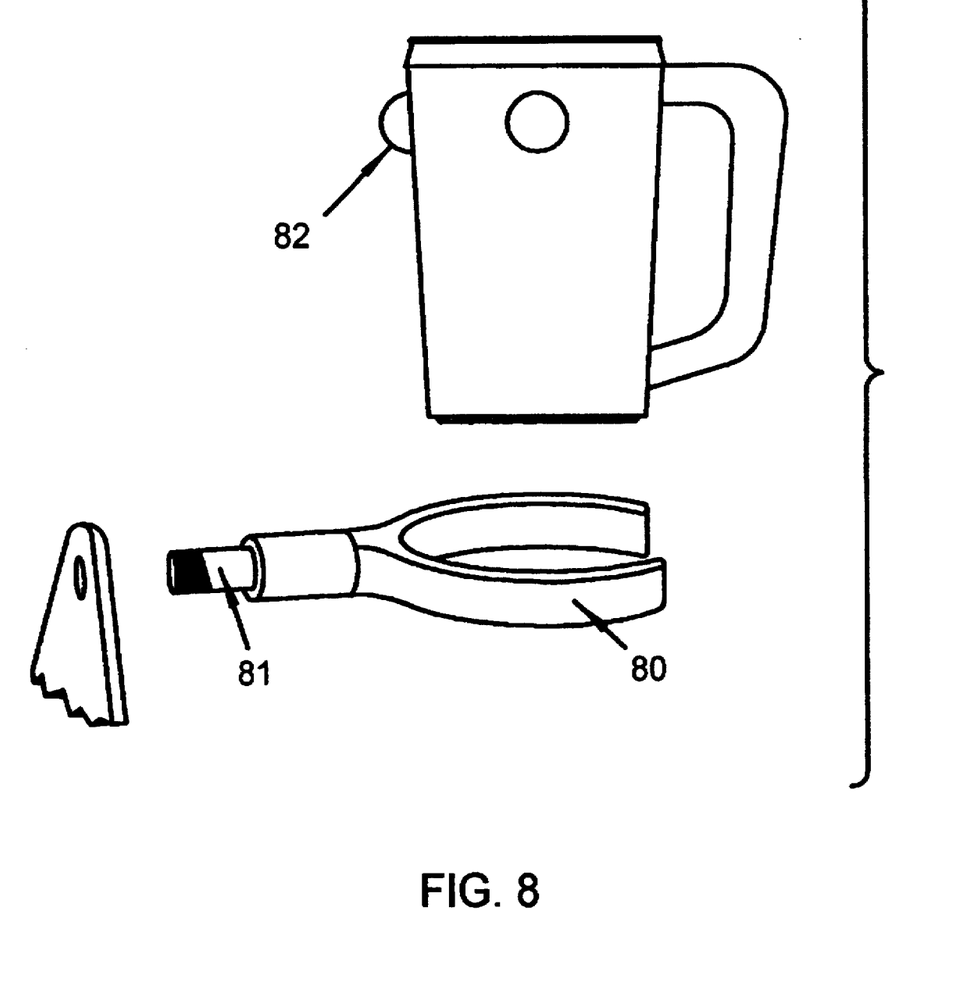
FIGS. 8 and 9 are alternative embodiments of the present invention.
Figure 9:
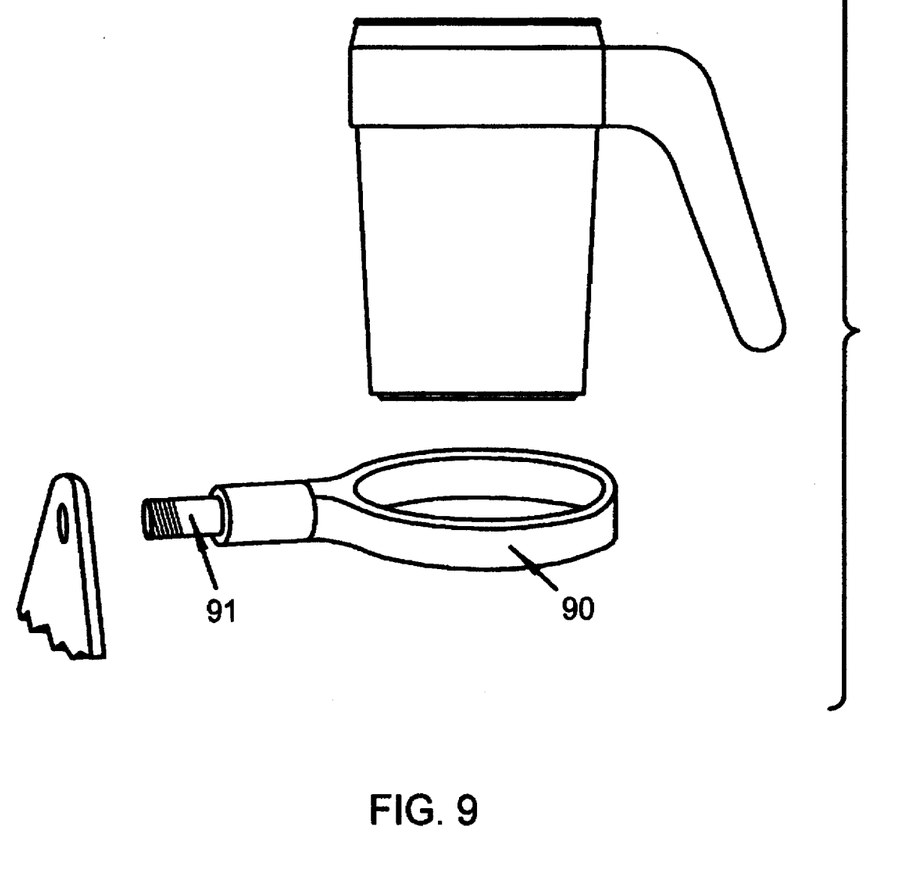

In a different embodiment of the present invention, the support member 80 or 90 may simply be pivotally mounted using threaded portion 81 or 91 to an appropriate location. However this design provides only one degree of rotational freedom.

Figure 2:
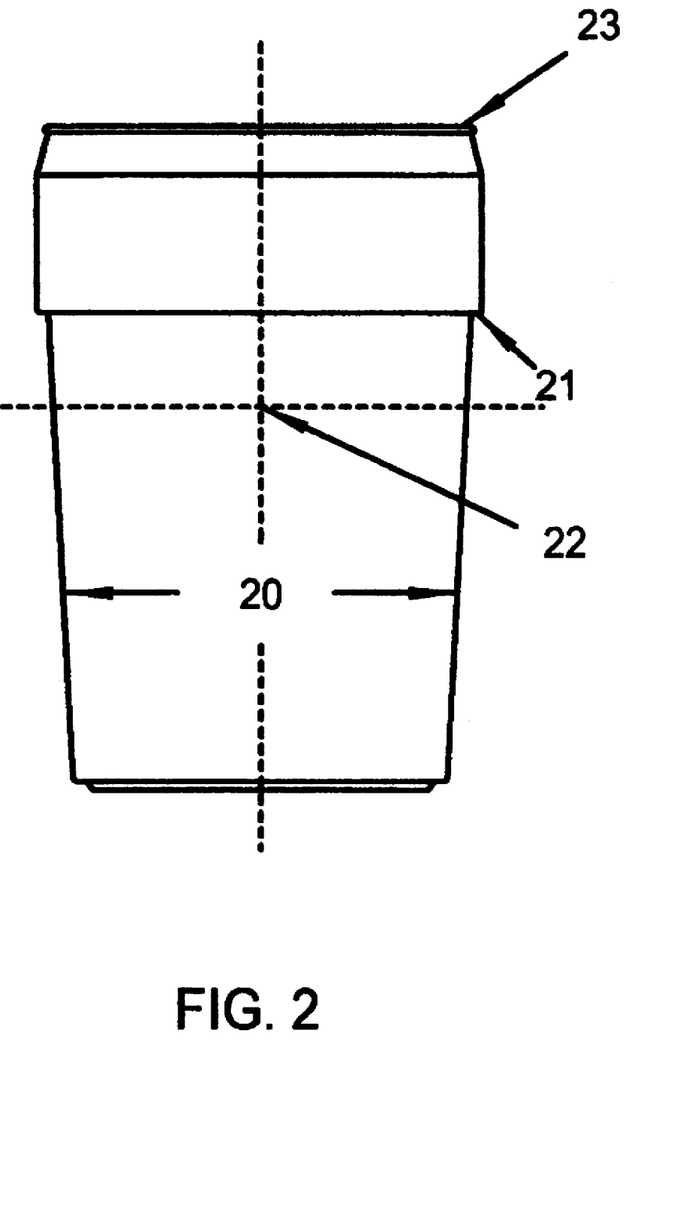
FIGS. 2 and 3 are beverage containers of the type preferably used with the invention.

The manner in which the support member 11 supports the beverage container is a matter of design preference. The support member may easily contact the entire periphery of a cylindrical portion of the beverage container simply using a ring for a support member. If a cylindrical beverage container having tapered sides 20 is used, the support ring may be designed to receive only that portion of the container below its center of gravity 22 by selecting an inner diameter for the support ring which equals the outer diameter of the container at a point above the container's center of gravity 22 when empty. When used, the weight of the beverage container and its contents will urge the container further into the support ring, creating a compressive force between the ring and the container sides (a "wedging" effect). The friction resulting from this compressive force allows the support ring to hold the container despite vertical movement caused by bumps or waves. This frictional force is sufficient to prevent accidental release of the beverage container without substantially impeding intentional removal.

Figure 7:
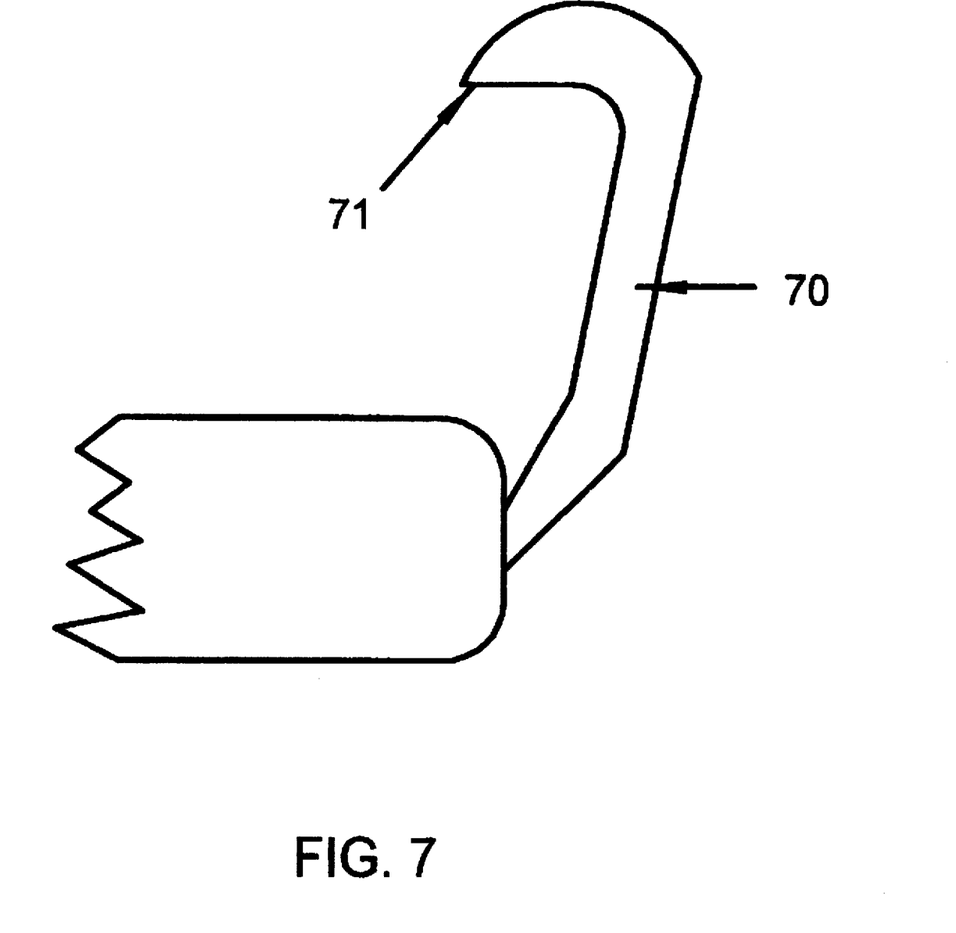
FIG. 7 is a self-actuating latch which may be usefully incorporated in the invention.

Regardless of whether the beverage container's sides are tapered, if a cylindrical container includes a protrusion or protrusions such as a rim 21 or "buttons" (cabochons) 82 above its center of gravity, the support ring may be designed with an inner diameter greater than the outer diameter of the container but less than the outer diameter of the protrusion or protrusions. Thus the support ring would receive the container and support it by virtue of the protrusion or protrusions, either with or without the "wedging" effect previously described. To prevent sudden vertical movement from causing the container to spring from the confines of the support ring, a self-actuating latch 70 may be affixed to the support ring, automatically engaging a portion of the beverage container when inserted. Latch 70 may be made of a flexible plastic material with a protrusion 71 which causes the latch to deform as the beverage container is being received by the support ring and engages the lip 23 or other portion of the beverage container once the support ring contacts the rim.

Figure 3:
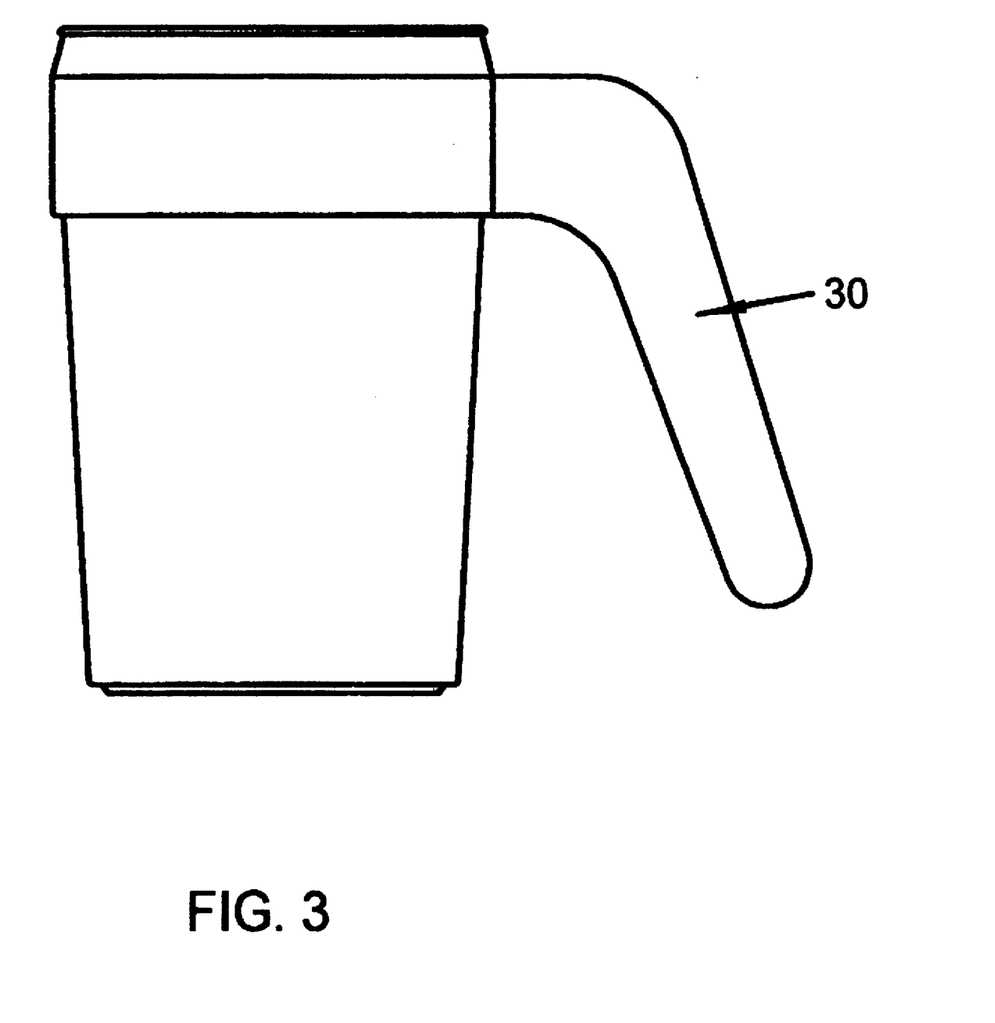
Figure 4:
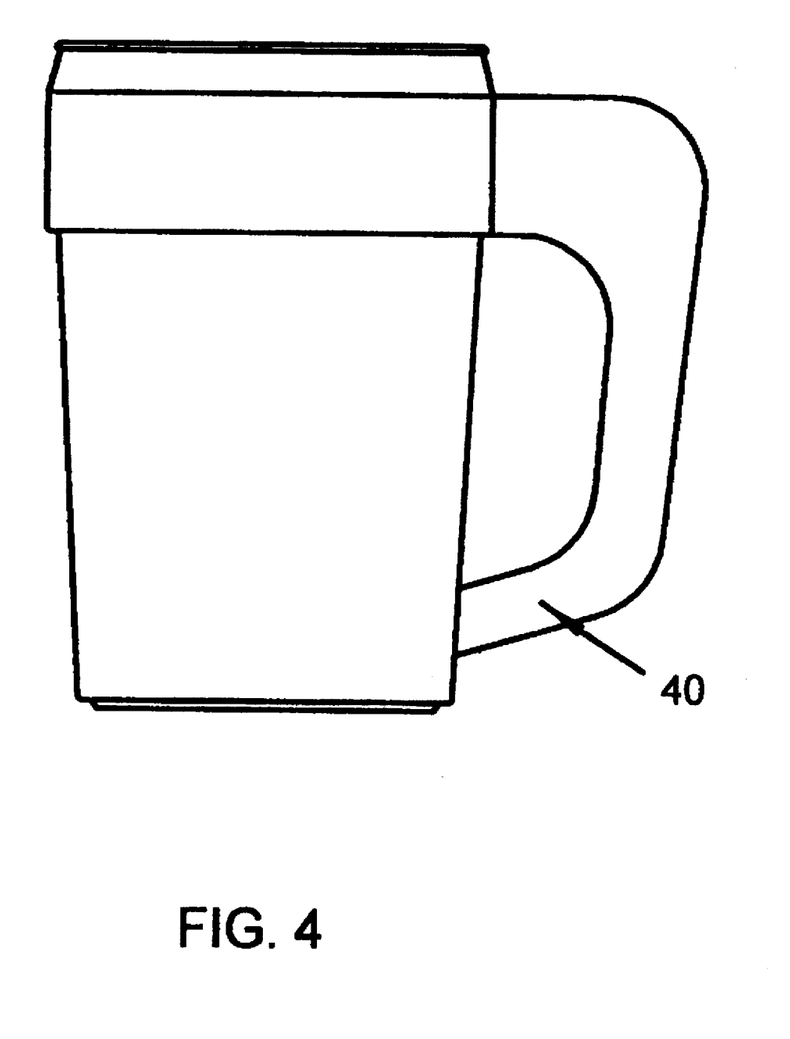
FIG. 4 is an alterative beverage container which may also be used with specific embodiments of the invention.
Figure 5:
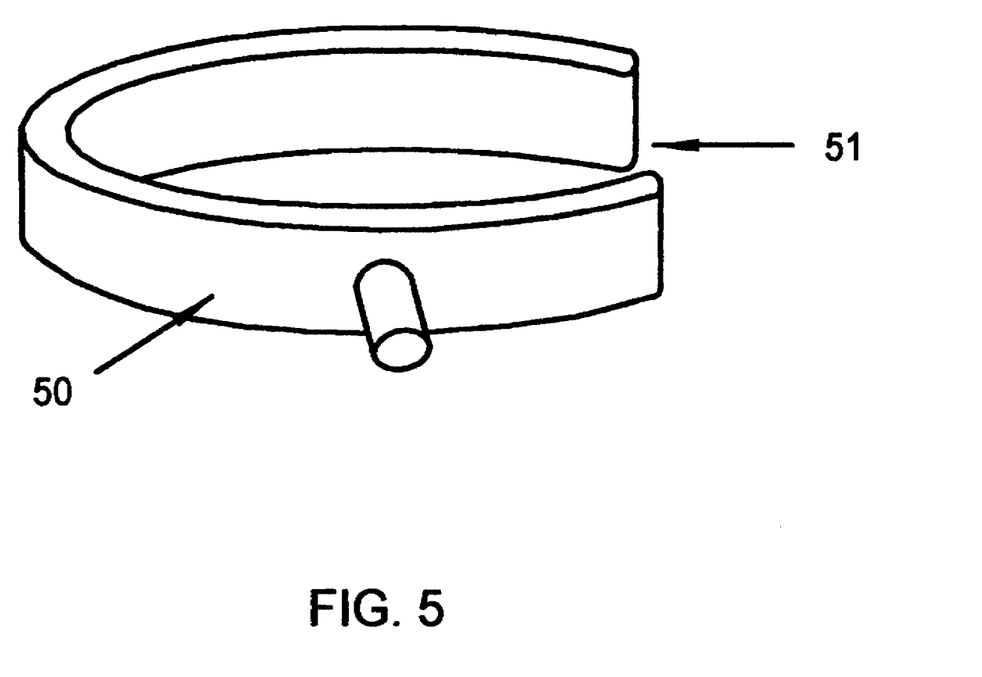
FIGS. 5 and 6 are components for embodiments of the invention designed for use with beverage containers of the type shown in FIG. 4.
Figure 6:
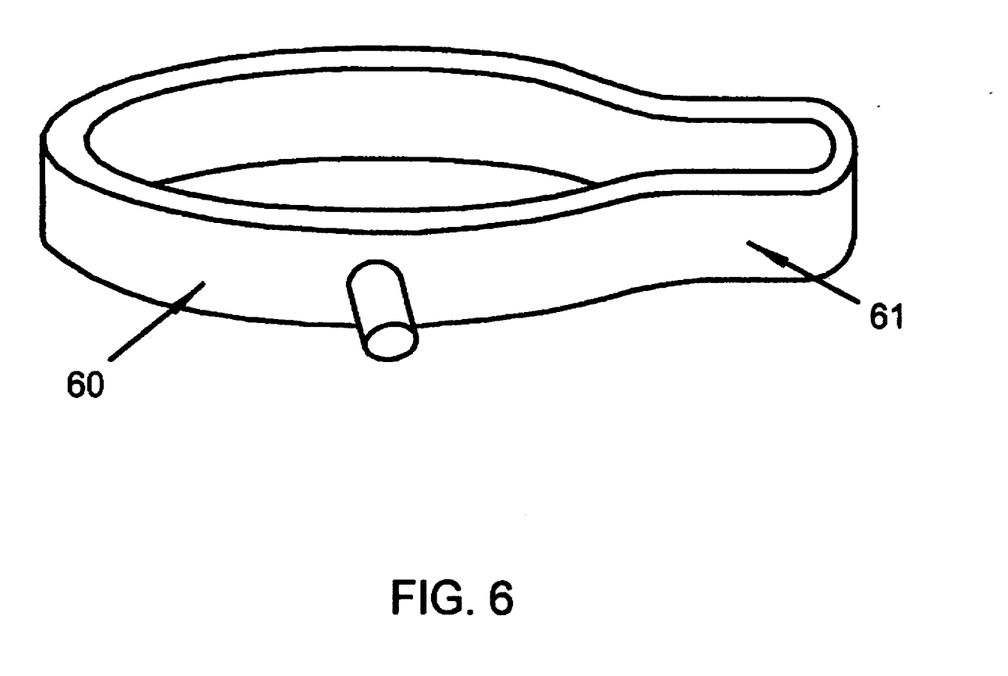

Beverage containers used with the present invention will preferably allow use of a circular support ring 11 either because the beverage container has no handle as shown in FIG. 2 or a cantilever handle 30 shown in FIG. 3, or the handle is designed to allow the support ring to receive the body of the container. However beverage containers having a mug-style loop handle as shown in FIG. 4 can be accommodated by using a C-shaped support ring 50 or by adapting a portion 61 of the support ring 60 to receive the handle. The support member thus contacts less than the entire periphery of a portion of the beverage container, with gap 51 or adapted portion 61 receiving handle 40.

Figure 10:
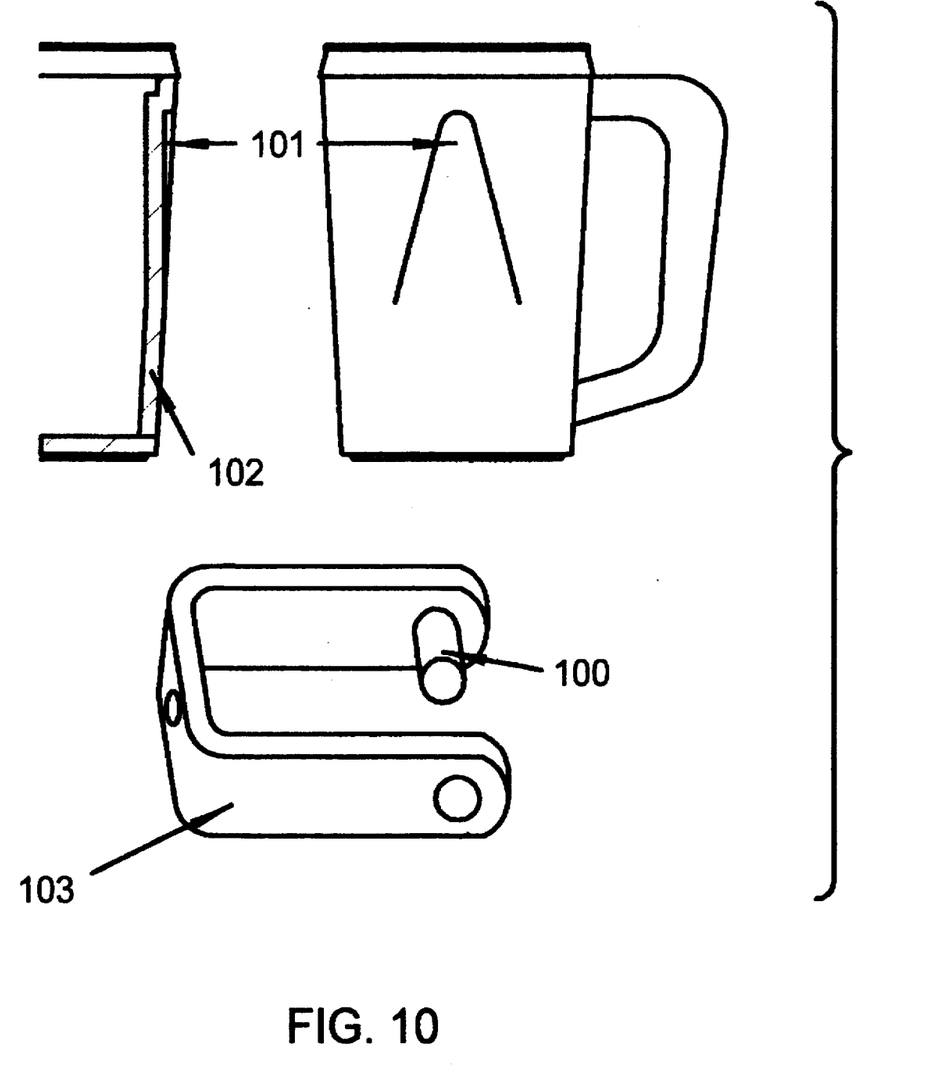
FIG. 10 is an alternative embodiment in which the beverage container is an integral portion of the receptacle of the present invention.

In yet another embodiment of the present invention, the support member 102 may be integrated into the beverage container and include "slots" 101 rather than holes for receiving pivots 100. If the mounting bracket 103 is itself pivotally mounted, the beverage container will still enjoy two degrees of rotational freedom.

The foregoing disclosure and description of the invention are illustrative and explanatory thereof, and various changes in the size, shape and materials, as well as in the details of the illustrated construction, may be made without departing from the spirit of the invention.

I claim:

1. An apparatus for supporting a beverage container, comprising:

a beverage container having a loop handle;

a one-piece support member contacting said beverage container and suspending said beverage container without a bottom support to said container by contact around a majority of its periphery at a point above said beverage container's center of gravity, said support member being adapted to receive said loop handle;

said loop handle attached to said beverage container above and below said contact with said support member; and a mounting bracket pivotally connected to said one piece support member.

2. The combination of a beverage container and a beverage container receptacle comprising:

a beverage container having a substantially cylindrical body and a loop handle;

a one-piece support ring directly receiving and contacting said beverage container around a majority of the periphery of said body above said beverage container's center of gravity thereby suspending said beverage container without bottom support to said container, said support ring including a pair of pivots and said support ring being adapted to receive said loop handle;

said loop handle being attached to said beverage container above and below said contact with said support member; and a mounting bracket having holes receiving said pivots.

* * * * *